(12) United States Patent
Shinozaki et al.

(10) Patent No.: US 8,314,843 B2
(45) Date of Patent: Nov. 20, 2012

(54) METHOD AND APPARATUS FOR INFORMATION REPRODUCTION (75) Inventors: Hiroshi Shinozaki, Ome (JP); Masatoshi Ookubo, Iruma (JP); Koichi Mitsuo, Ome (JP); Hiroyuki Irikura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 209 days.

(21) Appl. No.: 12/909,717

(22) Filed: Oct. 21, 2010

(65) Prior Publication Data
US 2011/0122262 A1 May 26, 2011

(30) Foreign Application Priority Data

Nov. 20, 2009 (JP) .................................. 2009-265451

(51) Int. Cl.
*H04N 5/232* (2006.01)
*H04N 5/228* (2006.01)
(52) U.S. Cl. ............... 348/211.14; 348/211.9; 348/222.1
(58) Field of Classification Search ............... 348/211.9, 348/211.14
See application file for complete search history.

(56) References Cited

U.S. PATENT DOCUMENTS

| 5,585,840 | A | * | 12/1996 | Watanabe et al. ................ 348/65 |
| 5,696,553 | A | * | 12/1997 | D'Alfonso et al. ....... 348/211.14 |
| 5,903,308 | A | * | 5/1999 | Cooper et al. ............. 348/211.9 |
| 6,160,578 | A | * | 12/2000 | Carroll et al. .............. 348/222.1 |
| 7,355,625 | B1 | * | 4/2008 | Mochida et al. ................. 348/65 |
| 7,456,863 | B2 | * | 11/2008 | Nakajima ................. 348/211.14 |
| 7,564,484 | B2 | * | 7/2009 | Rotte et al. .................. 348/211.1 |
| 7,714,894 | B2 | * | 5/2010 | Nakamura et al. ....... 348/211.14 |
| 7,728,876 | B2 | * | 6/2010 | Sakurai et al. ........... 348/211.14 |
| 7,889,239 | B2 | * | 2/2011 | Nakajima ................. 348/211.14 |
| 8,040,374 | B2 | * | 10/2011 | Ookubo et al. .................. 348/82 |
| 2006/0261282 | A1 | * | 11/2006 | Nakajima ................. 250/370.14 |
| 2009/0213212 | A1 | | 8/2009 | Nakamura |
| 2011/0013037 | A1 | * | 1/2011 | Irikura et al. .............. 348/222.1 |
| 2011/0013078 | A1 | * | 1/2011 | Shinozaki et al. ............. 348/375 |

FOREIGN PATENT DOCUMENTS

| JP | 11-027701 | | 1/1999 |
| JP | 2002232790 | A * | 8/2002 |
| JP | 2003224753 | A * | 8/2003 |
| JP | 2005-311535 | | 11/2005 |
| JP | 2006-191389 | | 7/2006 |
| JP | 2009-201540 | | 9/2009 |
| JP | 2009-267969 | | 11/2009 |

OTHER PUBLICATIONS

Japanese Patent Application No. 2011-239484; Notice of Reasons for Rejection; Mailed Nov. 29, 2011 (English translation).
Japanese Patent Application No. 2009-265451; Notice of Reasons for Rejection; Mailed Mar. 22, 2011 (English translation).

* cited by examiner

*Primary Examiner* — John Villecco
(74) *Attorney, Agent, or Firm* — Blakely, Sokoloff, Taylor & Zafman LLP (57) ABSTRACT

According to one embodiment, a camera apparatus includes, an imaging unit which acquires videos, a cable which connects the imaging unit to a control unit, and the control unit which comprises an asynchronous FIFO memory and a signal processing module and controls the imaging unit, the control unit performing transmitting to the imaging unit a drive signal configured to control an image sensor included in the imaging unit, and receiving a video signal including a clock signal or a synchronous signal output from the image sensor and converting this signal into a video signal standardized via the signal processing module.

23 Claims, 6 Drawing Sheets

F I G. 6

METHOD AND APPARATUS FOR INFORMATION REPRODUCTION

CROSS-REFERENCE TO RELATED APPLICATIONS

This application is based upon and claims the benefit of priority from Japanese Patent Application No. 2009-265451, filed Nov. 20, 2009; the entire contents of which are incorporated herein by reference.

FIELD

Embodiments described herein relates generally to signal processing in a case where a head is removed and a video signal processing method such as the output of signals to a subsequent stage, in a head (imaging unit) separation camera apparatus.

BACKGROUND

A camera apparatus using a complementary metal-oxide semiconductor (CMOS) image sensor has widely spread. It is to be noted that a camera apparatus in which a head, i.e., an imaging unit can be separated or a camera apparatus in which a head is provided in the distance has extensively put into practical use at present.

Japanese Patent Application Publication (KOKAI) No. 2006-191389 (KOKAI) discloses a video camera using asynchronous FIFO memory.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings. In general, according to one embodiment, a camera apparatus comprising: an imaging unit which acquires videos; a cable which connects the imaging unit to a control unit; and the control unit which comprises an asynchronous FIFO memory and a signal processing module and controls the imaging unit, the control unit performing: transmitting to the imaging unit a drive signal configured to control an image sensor included in the imaging unit; and receiving a video signal including a clock signal or a synchronous signal output from the image sensor and converting this signal into a video signal standardized via the signal processing module.

Embodiments will now be described hereinafter in detail with reference to the accompanying drawings.

Figure 1:
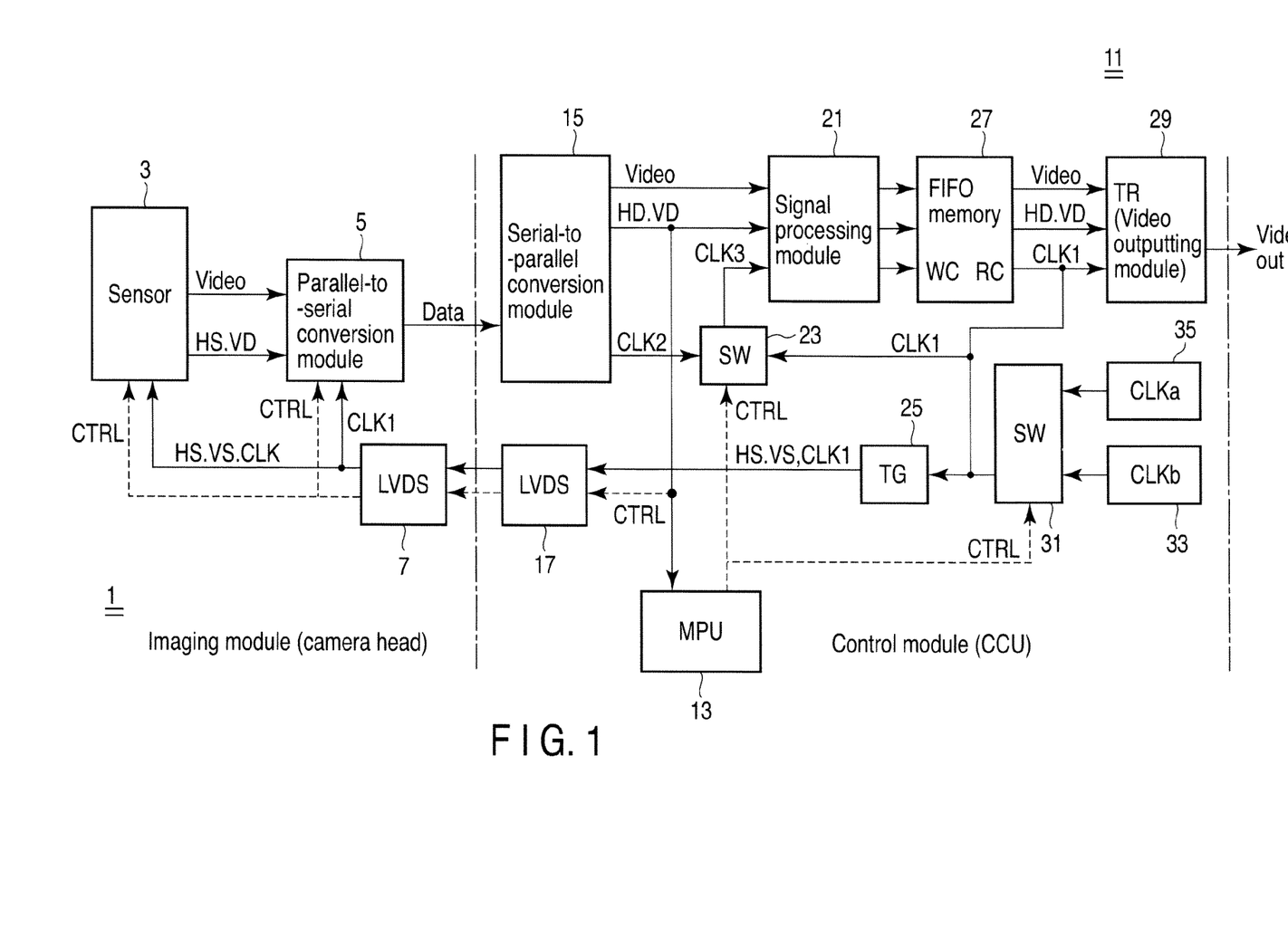
FIG. 1 is an exemplary diagram showing an example of a configuration of a head separation camera apparatus according to an embodiment.

FIG. 1 shows a head separation camera apparatus to which an embodiment is applied. It is to be noted that an element called a module may be realized by hardware or by software using, e.g., a CPU (microcomputer) in the following description.

The head separation camera apparatus depicted in FIG. 1 includes an imaging unit (camera head), i.e., an imaging module 1 and a communication control unit (CCU), i.e., a control module 11.

The imaging module 11 includes a complementary metal-oxide semiconductor (CMOS) image sensor 3, a parallel-to-serial conversion module 5 and a low-voltage differential signaling (LVDS) module 7 prepared in parallel to the parallel-to-serial conversion module 5.

The control module 11 includes a main control block (an MPU or a CPU) 13, a serial-to-parallel conversion module 15, an low-voltage differential signaling (LVDS) module 17, a signal processing unit 21, a clock switch (SW1) 23, a sensor drive signal generation module, i.e., a timing generator (TG) 25, an asynchronous FIFO memory 27, a video (signal) outputting module, i.e., a transmitter (TR) 29, a clock switch (SW2) 31, a first clock module (CLKb) 33 and a second clock module (CLKa) 35. It is to be noted that, as to the first and second clock modules 33 and 35, when an oscillating frequency of the second clock module (CLKa) 35 is 60 Hz, an oscillating frequency of the first clock module (CLKb) 33 is 60×1000/1001=59.94 Hz.

The clock switch (SW1) 23 and the clock switch (SW2) 31 selects a clock from the second clock module (CLKa) 35 or a clock from the first clock module (CLKb) 33 to be used based on a CTRL (control) signal from the MPU 13. It is to be noted that the CTRL (control) signal is also supplied to the LVDS 17 on the control module 11, the LVDS 7 on the head (imaging module 1) and the parallel-to-serial conversion module 5 on the head (imaging module). Furthermore, as to the CTRL, using, e.g., an i2c bus or 3-line serial bus is premised.

In the head separation camera apparatus depicted in FIG. 1, start of imaging by the sensor 3 is instructed by signals CLK1 (CLK) and CTRL (HS [horizontal synchronization], VS [vertical synchronization]) supplied via the LVDS 17 and the LVDS 7, and the sensor 3 outputs a video signal (Video), horizontal direction control data (HD) and vertical direction control data (VD).

The video signal (Video), the HD and the VD from the sensor 3 are subjected to serial conversion by the parallel-to-serial conversion module 5 and input to the serial-to-parallel conversion module 15 on the control module 11.

The serial-to-parallel conversion module 15 outputs the video signal (Video), the HD and the VD to the signal processing module 21 based on CLK3 (clock which is the result of selecting either CLK1 which is a clock from CLKa 35 or CLKb 33 selected by the clock switch (SW1) or CLK2 supplied from the serial-to-parallel conversion module 15) selected by the clock switch (SW1).

The signal processing unit 21 writes the video signal (Video), the HD and the VD into the asynchronous FIFO memory (First In-First Out Memory) 27 based on CLK3.

On the other hand, the FIFO memory 27 outputs the video signal (Video), the HD and the VD to the output driver circuit, i.e., transmitter (TR) 29 based on CLK1 from the clock switch (SW2) 31. That is, the video signal (Video), the HD and the VD which are read into the transmitter (TR, output driver circuit) 29 from the FIFO memory 27 are read based on an imaging unit drive signal generation CLK (CLK1 which is a resultant of selecting a clock from either CLKa 35 or CLKb 33 by the clock switch [SW2] 31) that is different from CLK3 supplied to the signal processing unit 21. As a result, even if the video signal (Video), the HD and the VD supplied from the head (imaging unit) 1 contain a jitter component or a skew component due to a distance between the head 1 and the control module 11, a video output (Video out) output from the TR (output driver circuit) 29 is a video signal from which the jitter component or the skew component has been removed.

In more detail, even in a general configuration which does not have the FIFO memory 27, the control module 11 likewise generates a sensor drive signal, and a video signal is likewise processed in synchronization with a CLK signal returned via the imaging module 1. Although a phase difference is produced as a length of a cable (wiring line) between the imaging module 1 and the control module 11 increases, since the CLK signal returned from the imaging module 1 is synchronized with the video signal, using the video signal for signal processing as it is enables coping with the phase difference which differs depending on the length of the cable.

On the other hand, the jitter component in the CLK signal generated by the control module 11 increases since the CLK signal passes through a plurality of components when it is output from the control module 11 and returned to the control module 11 via the imaging module 1. In the head separation camera apparatus in particular, in order to reduce the number of cables when transmitting a signal obtained by imaging from the imaging module 1 to the control module 11, it is often the case that the parallel-to-serial conversion module 5 performs serial conversion and the serial-to-parallel conversion module 15 performs parallel conversion to effect the transmission. In such a case, the jitter component increases due to interposition of each of phase loop lock (PLL) modules which carries out high-speed digital signal conversion processing in the parallel-to-serial conversion module 5 in the imaging module 1 and the serial-to-parallel conversion module 15 in the control module 11.

Although the jitter component does not greatly (directly) affect the signal processing, each of video signals conforming to the Digital Visual Interface (DVI) standard or Serial Digital Interface (SDI) standard which is widely utilized in recent years consists of a high-speed serial digital differential signal, and jitter is standardized with respect to these signals. To meet this standard value, the jitter must be reduced.

Therefore, as described above, the FIFO memory (first-in first-out memory) 27 is added to the subsequent stage of the signal processing unit 21, the video signal (Video) and the H (HD)/V (VD) signals and a DATA ENABLE signal are written into the FIFO memory 27 based on CLK returned from the imaging unit and used for the signal processing. An FLD (field period) signal indicative of a video data period is also written as required into the FIFO memory 27 based on CLK returned from the imaging unit and used for the signal processing. The video signal and the related signals (H(HD), V(VD) and DATA ENABLE) are read from the FIFO memory 27 by using the CLK signal having the same frequency as a write CLK generated from a stable CLK signal utilized for generation of the sensor (imaging module) drive signal, and these signals are transmitted to an IC (processor) which converts data of these signals into a DVI or SDI signal. Therefore, the video signal and the CLK signal are provided with high stable.

Figure 2:
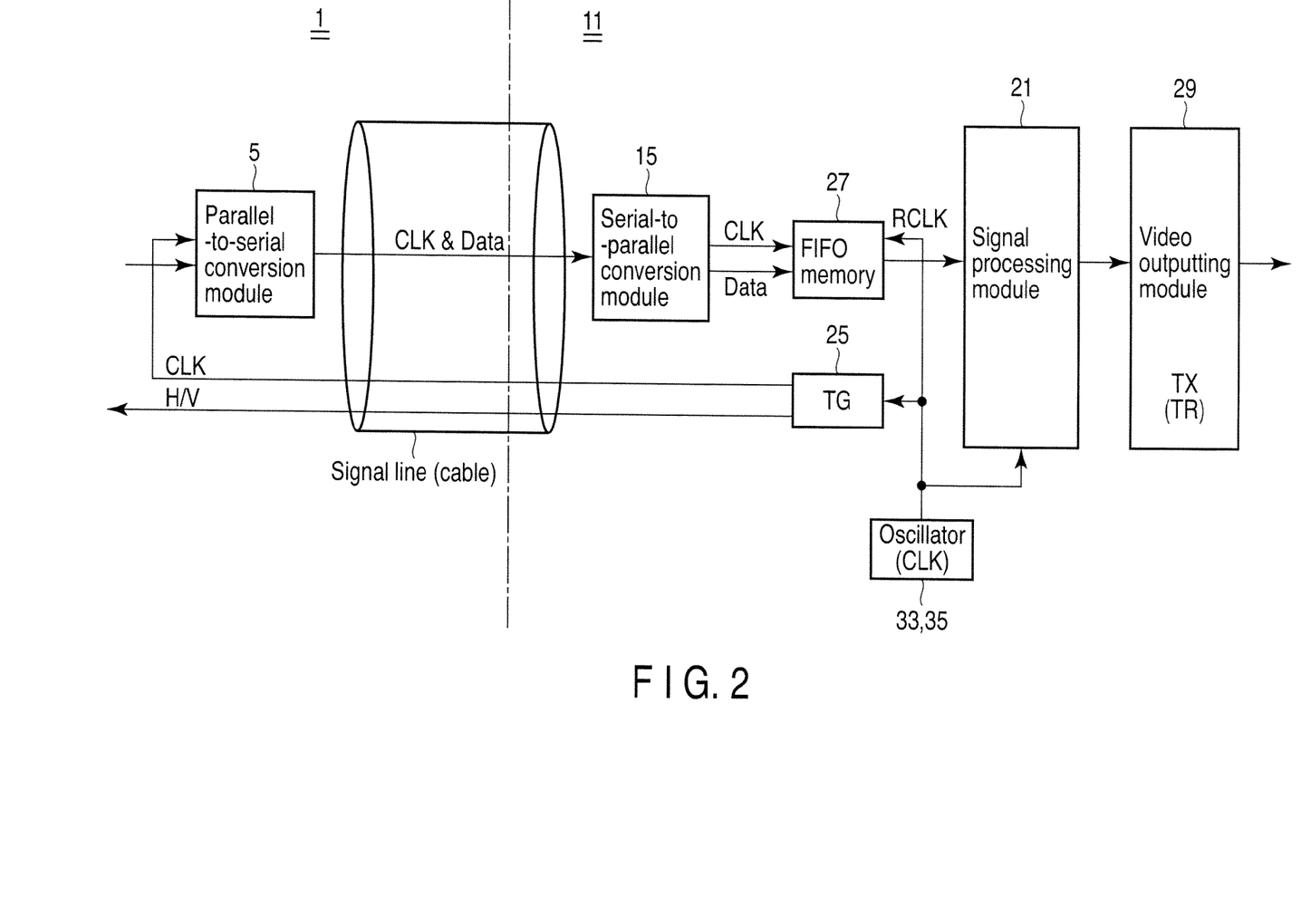
FIG. 2 is an exemplary diagram showing an example of another embodiment of the camera apparatus according to an embodiment.

FIG. 2 shows an example of modifying the signal processing in the head separation camera apparatus depicted in FIG. 1 which is an example of interposing the asynchronous FIFO memory 27 between the serial-to-parallel conversion module 15 and the signal processing unit 21 (previous stage of the signal processing unit 21). It is to be noted that a video output unit TX generally means a transmitter, but it is substantially equal to the TR (i.e., the video outputting module) 29 depicted in FIG. 1 (which may be referred to as a transmitter (TX) within the meaning of transmitting a video output to a subsequent stage).

One of characteristics in FIG. 2 is using a reset clock RCLK output from an oscillator 33, 35 to reset the FIFO memory 27. The reset clock RCLK same as the CLK1 of the clock switch (SW2) 31 with the CLKb of the first clock module 33 or the CLKa of the second clock module 35 are simplified form shown in FIG. 1. For example, when a distance between the head (imaging module) 1 and the CCU, i.e., the control module 11 is large (head 1 is provided at a distanced position), the jitter component or the skew component may be nonnegligibly increased when the video signal (Video), the HD and the VD are input to the signal processing unit 21. Therefore, when the FIFO memory 27 is utilized to previously remove the jitter component on the stage before inputting the signals to the signal processing unit 21, an influence of the distance between the head 1 and the CCU 11 can be reduced. In this case, the CLK signal (writing clock) which is written into the FIFO memory 27 is a CLK signal after the serial-to-parallel conversion, and the CLK to be read (read clock) is a signal generated by the oscillator 33, 35 of the control module 11 based on a CLK signal having the same frequency as that of the former CLK signal. The former CLK signal same as the CLK1 from the clock switch (SW2) 31 from the first clock module (CLKb) 33 or the second clock module (CLKa) 35, shown in FIG. 1.

Figure 3:
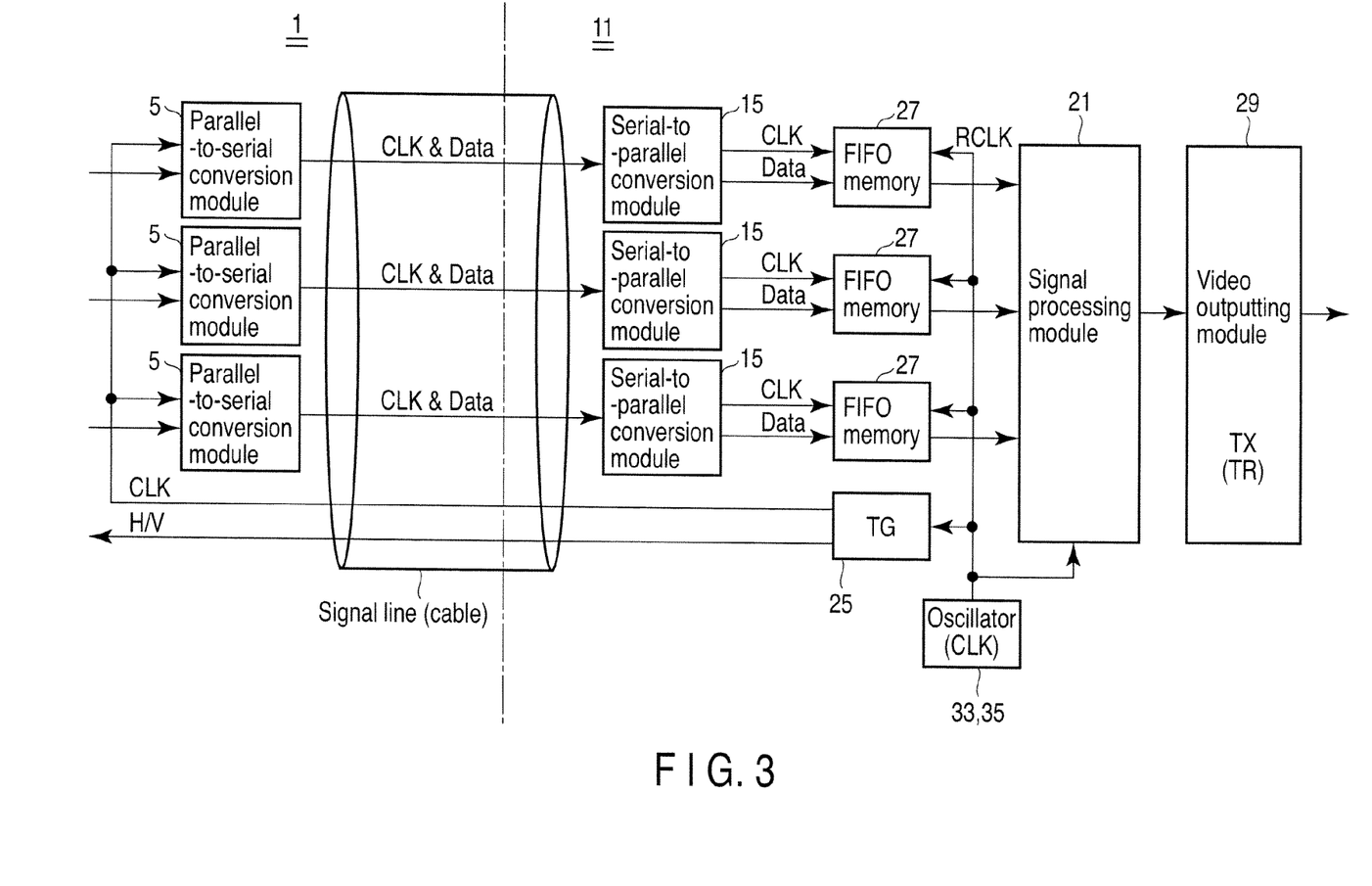
FIG. 3 is an exemplary diagram showing an example of still another embodiment of the camera apparatus according to an embodiment.

FIG. 3 shows an example of configuring the head separation camera apparatus depicted in FIG. 2 as a three-chip imaging system (system where the head uses independent CMOS sensors for respective color components, i.e., red [R], green [G] and blue [B]).

In the three-plate imaging system, for example, delay of a signal from each CMOS sensor should be taken into consideration besides the distance between the head 1 and the CCU (control module) 11, and it is useful to place the asynchronous FIFO memory 27 between the serial-to-parallel conversion module 15 and the signal processing unit 21 and previously remove the jitter component or the skew component from a video signal that is input to the signal processing unit 21.

That is, the FIFO memory 27 is added to the signal processing input end of each channel in the system that receives a plurality of signals from a plurality of sensors or a plurality of serialized LVDS signals, a timing is shifted due to skew between the channels that occurs when a cable length to connect the sensors and the signal processing input end is long. There for, the signal processing can be carried out at a fixed timing, whereby the jitter or the skew can be reduced.

Figure 4:
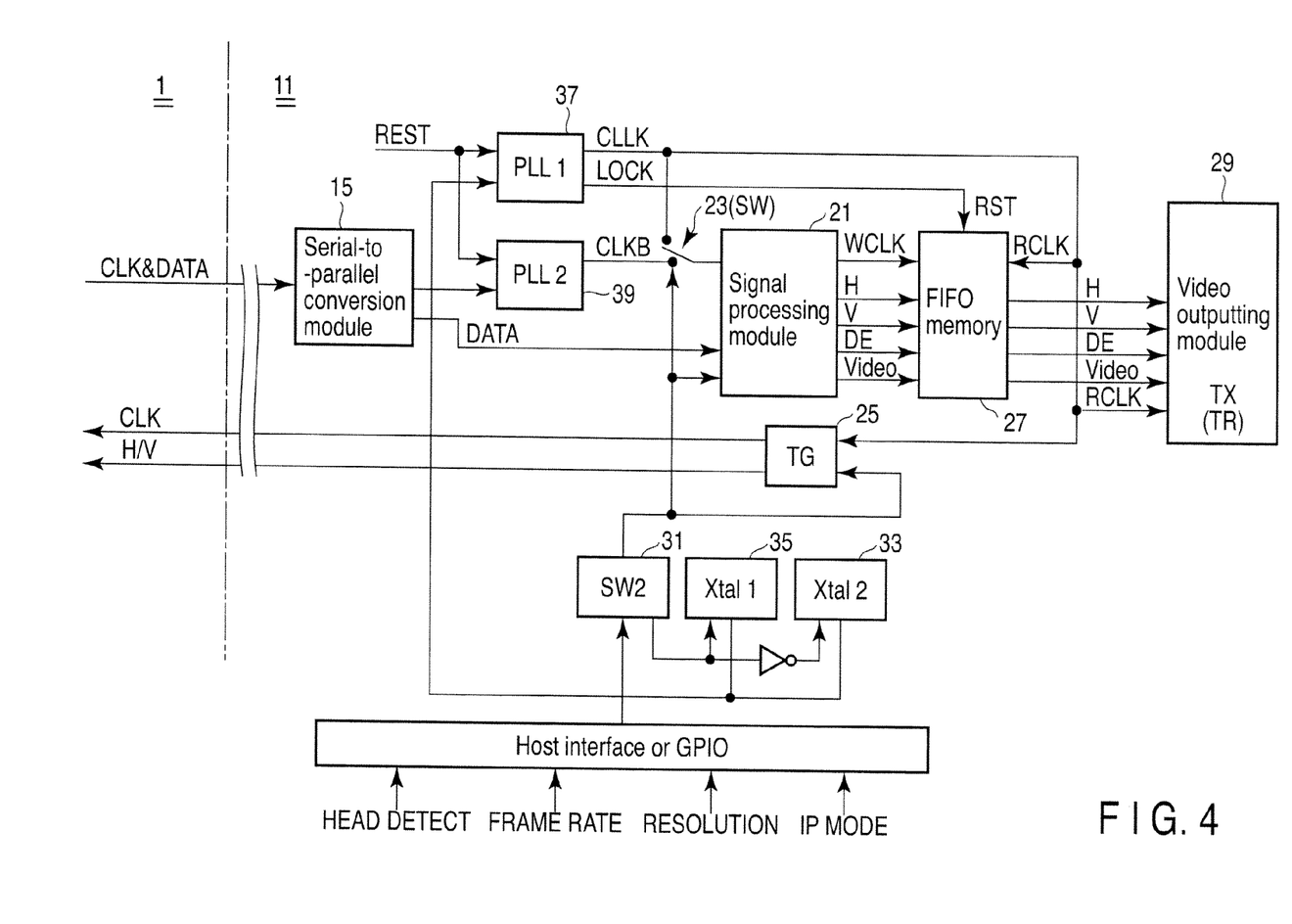
FIG. 4 is an exemplary diagram showing an example of yet another embodiment of the camera apparatus according to an embodiment.

FIG. 4 shows a further variation of signal processing in the head separation camera apparatus shown in FIG. 1. A first PLL module (PLL1) 37 and a second PLL module (PLL2) 39 are provided on a previous stage of the signal processing unit 21 (between the serial-to-parallel conversion module 15 and the signal processing unit 21). The CLK to be supplied to the TG 25, PLL(1) 37 and PLL(2) 39 in which a clock is selected from one of Xtal1 (corresponding to CKLa) 35 and Xtal2

(reverse of Xtal1) 33 by a clock switch (SW2) 31. There for, the video output (Video), HD and VD (H/V) can be stably output to a subsequent stage even in a no-signal (or no-clock) state in a case where, for example, the head (imaging module) 1 is separated by the clock switch (SW1) 23 which is provided on a previous stage of the signal processing unit 21, which is advantageous.

More specifically, in the head separation camera system, when a cable is detached, the no-signal state is generated. Furthermore, there are camera systems which enables imaging with a plurality of resolutions. Thus, when the output resolution or a frame rate of the camera is switched, or when a cable connecting the imaging module 1 with the control module 11 is put in or pulled out, timing to drive the sensor 3 (camera head 1) changes. As a result, the CLK signal temporarily received by the control unit becomes unstable, and hence there may occur a malfunction of the FIFO memory 27 or an irregularity in frequencies of the write and read CLK to/from the FIFO memory 27, which may lead to an empty or an overflow condition.

Therefore, after the above operation has been performed, no correct video signal may read from the FIFO memory 27, and a malfunction of a driver IC for a DVI or SDI output may occur, with the result that no picture may be displayed.

Here, as described above, the PLL module (PLL1) 37 and the PLL module (PLL2) of the CLK signal are provided with a RESET signal, and from the PLL1 and PLL2, a signal output showing a LOCK state is provided.

Then, a signal showing the LOCK state of an oscillator (output of Xtal(1) 35 or Xtal(2) 33 via SW(2) 31) is utilized to bring the FIFO memory 27 into RESET.

In the RESET of the FIFO memory 27, when there is an irregularity in frequency generated in switching the resolution or the frame rate, or a period of a temporary no-signal state by putting in or pulling out the cable, the video signal (video) output is stopped. When the PLL modules (PLL1 and PLL2) 37 and 39 become (recovery) a stable state, the RESET of the FIFO memory 27 is released to restart the output of the video signal.

Figure 5A:
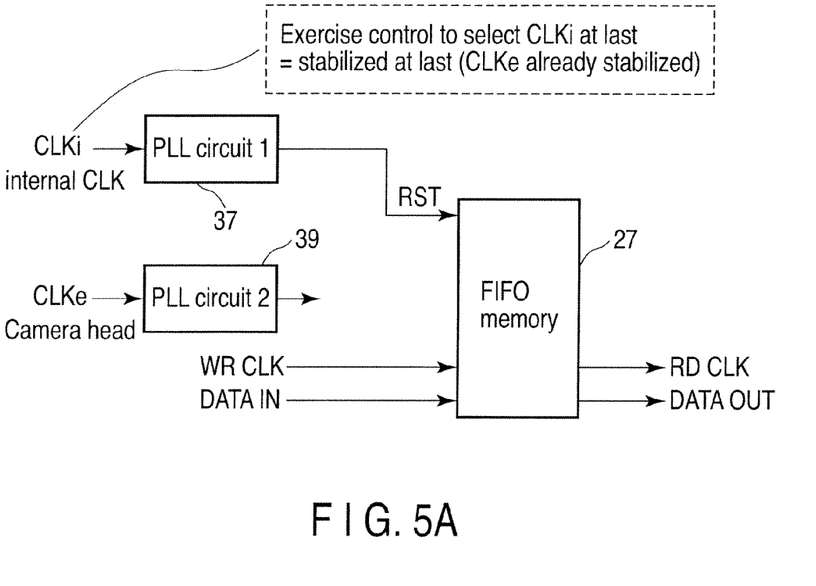
FIG. 5A is an exemplary diagram showing an example of signal processing of the camera apparatus according to an embodiment.
Figure 5B:
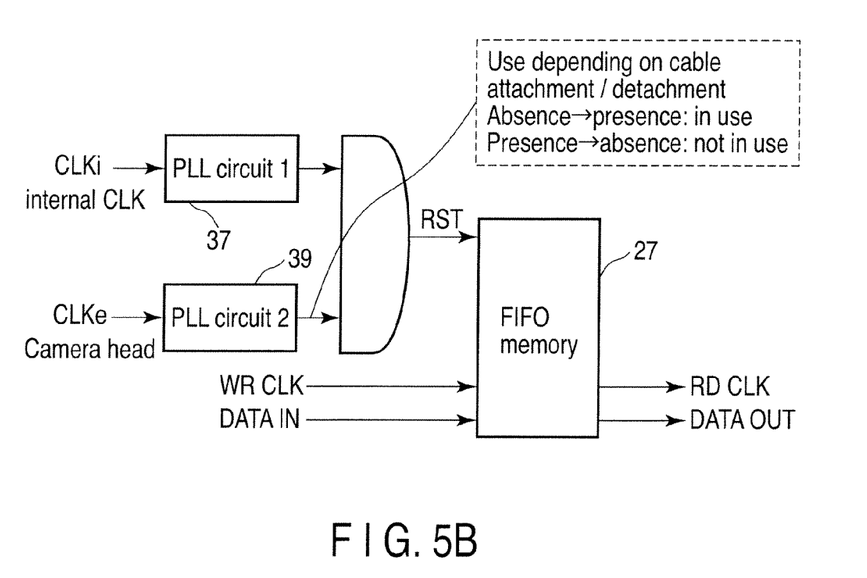
FIG. 5B is an exemplary diagram showing an example of signal processing of the camera apparatus according to an embodiment.

FIGS. 5A and 5B show control examples of the MPU, the FIFO and the signal processing circuit (modules) with respect to a state change described in FIG. 4. Giving a description on an abstract (of FIG. 4) in conjunction with FIGS. 5A and 5B, even in a case that CLKe that is input to the PLL (2) for the camera head 1 cannot be detected (it is not stable), when a procedure of the CLK which is supplied from a microcomputer (host interface or GPIO shown in FIG. 4 or the MPU 13 depicted in FIG. 1) is set (fixed) to supply CLKi (an internal clock), i.e., a reset signal RST to the FIFO 27 from the PLL (1), a stable operation can be obtained (FIG. 5A).

Moreover, as shown in FIG. 5B, when AND of CLKi (internal clock), i.e., the PLL (1) 37 and CLKe, i.e., the PLL (2) 39 is taken, the process of selecting the CLK from the microcomputer (host interface or the GPIO shown in FIG. 4 or the MPU 13 depicted in FIG. 1) is no longer required. It is to be noted that, in the example depicted in FIG. 5B, "without head: PLL (2) used" and "with head: PLL (2) not used" are switched in accordance with attachment/detachment of the cable (from the head 1 side) (whether the camera head is to be separated (removed)).

That is, when executing the RESET (reset), a current operation is switched to an operation using a stable internal CLK (drive signal generation CLK), and then each PLL is subjected to the RESET (reset). Each setting is configured to determine paths of the internal circuits (modules), and each PLL modules is again subjected to the RESET. As a result, when each PLL modules is stabilized, the signal indicative of the LOCK state is output, and the FIFO memory 27 starts a normal operation irrespective of presence/absence of the imaging unit (head) 1 or the settings, thereby restarting the output of the video signal (Video), the HD and the VD.

Figure 6:
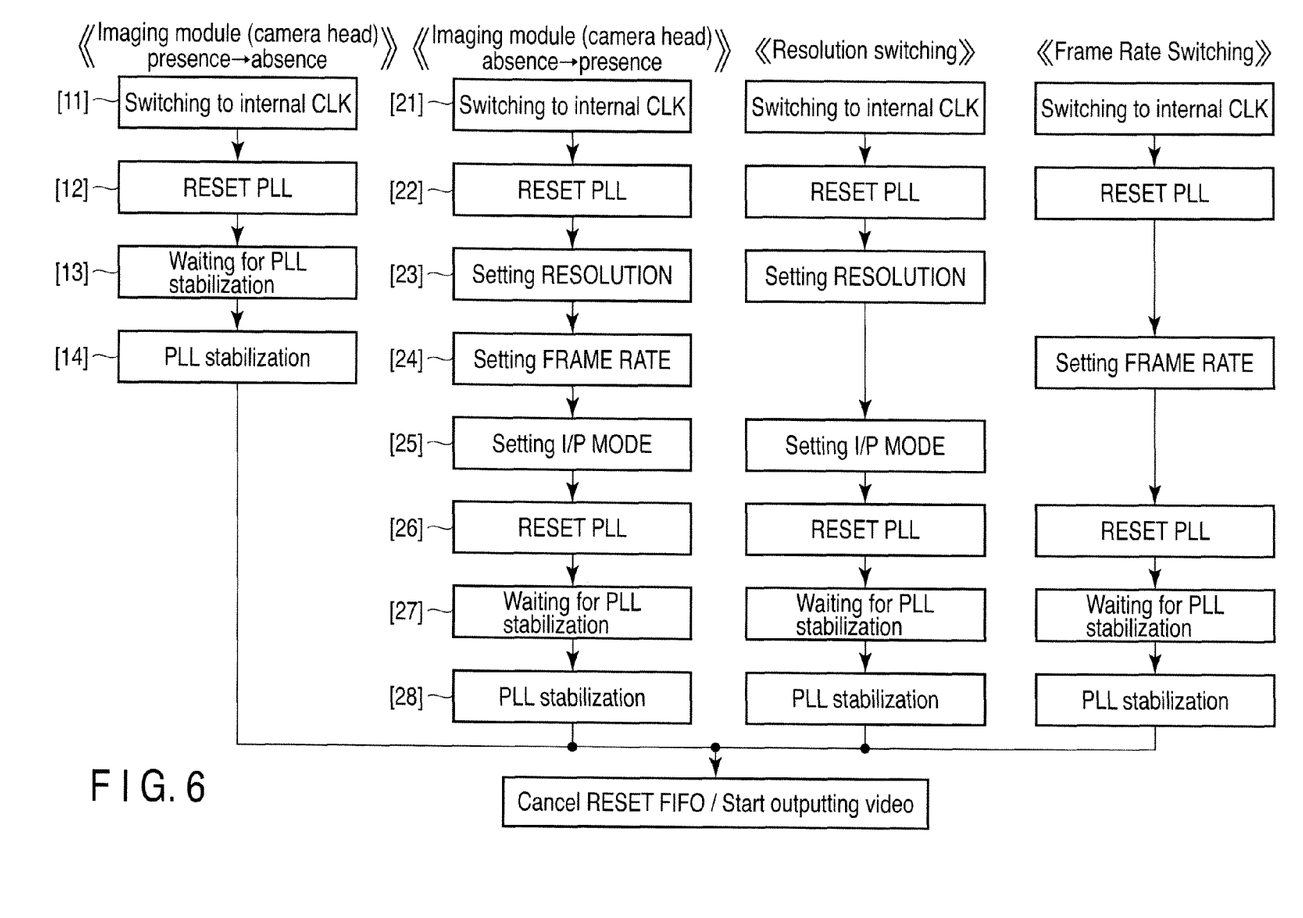
FIG. 6 is an exemplary diagram showing an example of a control method of the camera apparatus according to an embodiment.

As shown in an example in FIG. 6, it is to be noted that the RESET processing of the PLL1 and PLL2 can be executed by informing the following reset involved by presence/absence of the camera head 1 from the MPU 13 through the control signal, switching the paths for the CLK signal or the video signal in the internal circuits (modules) and performing the RESET (reset) control from the outside:

(HEAD DETECT
    <<Imaging Unit (HEAD: Presence→Absence)>>,
    <<Imaing Unit (HEAD: Absence→Presence)>>,
    <<Frame Rate (FRAME RATE) Switching>>, and
    <<Scan Mode (IP MODE) switching>>.

In more detail, as shown in FIG. 6, in the case of HEAD DETECT
    <<Imaging Unit (HEAD: Presence→Absence)>>,
it is sufficient to cancel the RESET of the FIFO memory 27 and restart the output of the video signal (Video), the HD and the VD after respective pieces of processing, i.e., switching to the internal CLK ([11]), PLL reset ([12]), waiting for PLL stabilization ([13]) and PLL stabilization ([14]).

Additionally, in the case of HEAD DETECT
    <<Imaging Unit (HEAD: Absence→Presence)>>,
it is sufficient to execute RESOLUTION (resolution) setting ([23]), FRAME RATE (frame rate) setting ([24]) and IP MODE (scan mode) setting ([25]) after the switching to the internal CLK ([21]) and the PLL reset ([22]), cancel the RESET of the FIFO memory 27 after the respective pieces of processing, i.e., PLL reset ([26]), waiting for PLL stabilization ([27]) and PLL stabilization ([28]), and restart the output of the video signal (Video), the HD and the VD.

It is to be noted that
    <<Frame Rate (FRAME RATE) Switching>>,
    <<Resolution (RESOLUTION) Switching>> or
    <<Scan Mode (IP MODE) Switching>>
is substantially equal to a procedure obtained by partially omitting HEAD DETECT
    <<Imaging Unit (HEAD: Absence→Presence)>>, thereby omitting a detailed explanation thereof.

As described above, when the embodiment is applied, since a stable digital signal can be output by absorbing the skew or the jitter produced due to unevenness in components or cables, the jitter when generating a high-speed digital signal such as DVI or HD-SDI can be reduced, and the stable digital signal can be generated. That is, it is possible to obtain the head separation camera system that is not affected by skew or jitter characteristics produced due to a distance between the control unit and the imaging unit (camera head) or unevenness in components or lengths of cables disposed between the imaging unit and the control unit.

Further, it is possible to realize the head separation camera apparatus that can assure (reset) clocks when the head is separated or can reduce an influence of the jitter or the skew caused due to delay of a signal from the head provided at a distanced position.

Furthermore, it is possible to generate a stable digital signal having reduced jitter for generation of a standardized high-speed digital signal such as DVI or HD-SDI without requiring a high-capacity memory like a frame memory.

It is to be noted that the reset signal of the FIFO when the imaging unit is separated is particularly useful in this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head separation type camera apparatus in which an imaging unit and a control unit for controlling the imaging unit are connected by a cable, the control unit comprising:
   a signal processing circuit which performs signal processing on a video signal output from the imaging unit;
   a First In-First Out (FIFO) memory provided after the signal processing unit, and configured to eliminate jitter from a signal output from the signal processing circuit and output a resultant signal; and a video output circuit which converts a video signal output from the FIFO memory into a standardized video signal in which an allowable jitter amount is determined.

2. The head separation type camera apparatus of claim 1, wherein
   the imaging unit comprises an image sensor and a first conversion circuit which performs serial conversion with respect to an output from the image sensor; and
   the control unit comprises a second conversion circuit which performs parallel conversion with respect to a signal supplied from the first conversion circuit.

3. The head separation type camera apparatus of claim 1, wherein the control unit supplies a reset signal configured to reduce an erroneous operation of the asynchronous FIFO memory to a Phase Loop Lock (PLL) module provided on a previous stage of the asynchronous FIFO memory at a predetermined timing or comprises a PLL circuit provided on a previous stage of the FIFO memory and configured to supply a reset signal when a specific operation state occurs.

4. The head separation type camera apparatus of claim 3, wherein the PLL circuit outputs the reset signal when a LOCK state occurs.

5. The head separation type camera apparatus of claim 4, wherein the specific operation state is a no-signal state which occurs when the imaging unit is disconnected.

6. The head separation type camera apparatus of claim 4, wherein the specific operation state is a state in which an output resolution or a frame rate of the imaging unit is switched.

7. The head separation type camera apparatus of claim 2, wherein the image sensor include two or more image sensor components.

8. A head separation type camera apparatus in which an imaging unit and a control unit for controlling the imaging unit are connected by a cable, the control unit comprising:
   a Phase Loop Lock (PLL) circuit which supplies a reset signal at a predetermined timing or when a specific operation state occurs;
   a First In-First Out (FIFO) memory which controls timing of a video signal output from the imaging unit;
   a signal processing unit which performs signal processing on a video signal output from the FIFO memory; and
   a video output circuit which converts a video signal output from the signal processing unit into a standardized video signal in which an allowable jitter amount is determined.

9. The head separation type camera apparatus of claim 8, wherein the imaging unit comprises an image sensor and a first conversion circuit which performs serial conversion with respect to an output from the image sensor; and
   the control unit comprises a second conversion circuit which performs parallel conversion with respect to a signal supplied from the first conversion circuit.

10. The head separation type camera apparatus of claim 8, wherein the PLL circuit is provided on a previous stage of the FIFO memory and is configured to supply a reset signal to the FIFO memory at a predetermined timing or when a specific operation state occurs.

11. The head separation type camera apparatus of claim 10, wherein the PLL circuit outputs the reset signal when a LOCK state occurs.

12. The head separation type camera apparatus of claim 10, wherein the specific operation state is a no-signal state which occurs when the imaging unit is disconnected.

13. The head separation type camera apparatus of claim 10, wherein the specific operation state is a state in which an output resolution or a frame rate of the imaging unit is switched.

14. The head separation type camera apparatus of claim 10, wherein the image sensor include two or more image sensor components.

15. A video signal processing method for use in a head separation type camera apparatus in which an imaging unit and a control unit for controlling the imaging unit are connected by a cable, the method comprising:
   causing a signal processing unit to perform predetermined signal processing on a video signal output from the imaging unit;
   temporarily storing the video signal in a First In-First Out (FIFO) memory and reading the video signal therefrom to eliminate jitter from the video signal, and converting the jitter-eliminated video signal into a standardized video signal in which an allowable jitter amount is determined.

16. The video signal processing method of claim 15, wherein when a specific operation state is detected before the jitter is eliminated, a reset signal is supplied to reset a Phase Loop Lock (PLL) circuit.

17. The video signal processing method of claim 15, wherein when the PLL circuit is in a LOCK state, the reset signal is output.

18. The video signal processing method of claim 16, wherein a detection of the specific operation state is a detection of a no-signal state which occurs when the imaging unit is disconnected.

19. The video signal processing method of claim 16, wherein a detection of the specific operation state is a detection of a state in which an output resolution or a frame rate of the imaging unit is switched.

20. A video signal processing method for use in a head separation type camera apparatus in which an imaging unit and a control unit for controlling the imaging unit are connected by a cable, the method comprising:
   causing a Phase Loop Lock (PLL) circuit to supply a reset signal at a predetermined timing or when a specific operation state is detected;
   temporarily storing and reading a video signal, output from the imaging unit, into and from a First In-First Out (FIFO) memory to thereby eliminate jitter;
   causing a signal processing unit to perform signal processing on a video signal output from the FIFO memory; and
   converting a video signal output from the signal processing unit into a standardized video signal in which an allowable jitter amount is determined.

21. The video signal processing method of claim 20, wherein when the PLL circuit is in a LOCK state, the reset signal is output.

22. The video signal processing method of claim 20, wherein a detection of the specific operation state is a detection of a no-signal state which occurs when the imaging unit is disconnected.

23. The video signal processing method of claim 20, wherein a detection of the specific operation state is a detection of a state in which an output resolution or a frame rate of the imaging unit is switched.

* * * * *